United States Patent
Ripy et al.

(10) Patent No.: US 6,393,111 B1
(45) Date of Patent: May 21, 2002

(54) METHOD FOR TRANSMITTING AND RECEIVING DATA OVER A HOME NETWORK IMPLEMENTED UPON A PHONE LINE SYSTEM

(75) Inventors: Paul B. Ripy, Fremont; Shih-Chian Yang, Danville, both of CA (US)

(73) Assignee: Broadmedia, Inc., Sunnyvale, CA (US)

( * ) Notice: Subject to any disclaimer, the term of this patent is extended or adjusted under 35 U.S.C. 154(b) by 0 days.

(21) Appl. No.: 09/426,360

(22) Filed: Oct. 25, 1999

Related U.S. Application Data

(63) Continuation of application No. 09/162,389, filed on Sep. 28, 1998, now Pat. No. 6,137,865.

(51) Int. Cl.$^7$ .............................................. H04M 11/00
(52) U.S. Cl. .............................. 379/93.05; 379/90.01; 379/93.08
(58) Field of Search .......................... 379/90.01, 93.05, 379/93.07, 93.08, 93.09, 93.28; 370/357, 364, 365, 276, 277, 228, 216, 297

(56) References Cited

U.S. PATENT DOCUMENTS 5,960,066 A * 9/1999 Hartmann et al. ....... 379/90.01

* cited by examiner

Primary Examiner—Stella Woo
Assistant Examiner—Melur Ramakrishnaiah
(74) Attorney, Agent, or Firm—Junrui Yang; Joe Zheng; C. P. Chang

(57) ABSTRACT

A network interface for home networking implemented upon an existing 4-wire (two-pair) phone line system is disclosed. The interface comprises two transmitters, two line isolators and a receiver. The two transmitters transmit data simultaneously to both of the pairs of wires in the phone line system so that all devices coupled to the phone line system, regardless which pair of wires being coupled onto, can receive the data. Because all the pairs carry the data, there is therefore needed one on receiver in the interface to receive the data transmitting over the phone line system. The disclosed interface provides a solution to the home networking which no longer requires the knowledge of the underlying wiring structure in the phone line system.

7 Claims, 7 Drawing Sheets

METHOD FOR TRANSMITTING AND RECEIVING DATA OVER A HOME NETWORK IMPLEMENTED UPON A PHONE LINE SYSTEM

The present application is a continuation of U.S. App. Ser. No. 09/162,389, filed Sep. 28, 1998, now U.S. Pat. No. 6,137,865, issued on Oct. 24, 2000.

BACKGROUND OF THE INVENTION

1. Field of the Invention

The present invention generally relates to computer networking technology and more particularly relates to transmission and reception of data over a home network implemented upon a phone line system in a residential home.

2. Description of the Related Art

The Internet is a rapidly growing communication network of interconnected computers and computer networks around the world. Together, these millions of connected computers form a vast repository of multimedia information that is readily accessible by any of the connected computers from anywhere at any time. Just as there is a critical need for high-speed connections to the information on the Internet, there is a growing need to rapidly move the information between devices within a home. Businesses accomplish this by deploying Local Area Networks (LANs); however, networks are not commonly deployed in the home due to the cost and complexity of installing the new wiring system typically required by the traditional LANs. Nevertheless, there exists a phone line system in nearly every home in the United States. Therefore a great demand for a simple high-speed and cost-effective home network based on the existing phone line system is tremendously growing.

The driving force behind the home network is the growth of on-line households and the growing number of homes with two or more personal computers. It is reported that more than 47 percent of US households are likely to have Internet access devices by 2002, with some 20 percent of this subset owning multiple devices that need to share access to the Internet as well as each other. With the increased focus on computers in education and the boom in Internet connectivity, a large number of personal computers being purchased today are additional personal computers, as opposed to replacement units. Today, it is estimated that over 15 million of the nearly 100 million homes in the United States have two or more personal computers. This number is growing 30 percent annually.

FIG. 1A shows one of the current implementations of a multiple access network over existing wiring structure in a home. It is generally understood that the phone line in a home includes two pairs of wires, traditionally referred to as a primary pair of wires and a secondary pair of wires. Technically, either one of the pairs may be used for the telephone communication. A home network card 100 as shown in FIG. 1A uses one pair of wires 101. A primary transmitter 102 and a primary receiver 104 are both coupled to the pair 101 via a line isolator 106. The primary transmitter 102 ensures that transmit data can be transmitted over the pair of wires 101 while the primary receiver 104 ensures that data can be received from the pair of wires 101. Isolation circuit 106, as the name suggests, isolates the operation of the home network card 100 from the regular phone services on the pair of wires 101 so that the normal telephone communication can be carried out without being disturbed due to the data networking over the phone lines.

Analogous to a telephone set, the home network card 100 does not use the second pair of wires 103 available in most household wiring structures today, which, nevertheless, often causes inconvenience to many users. Generally, it is difficult to identify which pair is in operation with other devices when a home network card is to be coupled to a wall outlet unless an instrument is available or the color of the wires is correctly identified. Many users then would have to go through the trials-and-errors in order to couple the network card correctly with other devices. To solve the problems, some simply use a balun circuit 108 as shown in FIG. 1B to facilitate the use of the second pair. Therefore a device may be connected to either pair for communication with other devices.

The balun circuit 108, however, requires that a home owner installs a balun at the egress point that transitions the telephone lines from the public switched telephone network to the home's entry. This intervention is typically complicated and undesirable. Therefore, there is a great need for an interface in a home network card that requires no additional installation by a home owner in order to use either one of the pairs in the existing home phone line system.

SUMMARY OF THE INVENTION

The present invention has been made in consideration of the above described problems and needs. The disclosed invention, for the first time, provides a generic solution to the transmission and reception of data over a home network implemented upon an existing phone line system, in which a user does not have to identify any particular pair of wires for data communication. Thereby all devices coupled to the phone line system, regardless to which pair of wires being coupled onto, can communicate among themselves or access the Internet via a ISP access device.

According to one embodiment, the present invention is an apparatus for data communication over a home network implemented on a phone line system comprising a primary pair of wires and a secondary pair of wires, the apparatus comprising:

two transmitters, one being a primary transmitter and the other being a secondary transmitter;

a first line isolator and a second line isolator, the primary transmitter being coupled to the primary pair of wires via the first line isolator and the secondary transmitter being coupled to the secondary pair of wires via the second line isolator; and wherein the transmitters transmit data to both the primary and the secondary pair of wires so that a computing device coupled to the home line system, regardless through which one of the primary pair of wires and the secondary pair of wires, can receive the data.

According to another embodiment, the present invention is a method for data communication over a home network implemented on a phone line system comprising a primary pair of wires and a secondary pair of wires, the method comprising:

receiving transmit data from a data source; and transmitting, through a pair of transmitters, the transmit data to both the primary pair of wires and the secondary pair of wires in the phone line system, receiving, through a receiver, incoming data transmitting in the phone line system; wherein the incoming data is sent from the transmitters in a computing device coupled to the phone line system.

Accordingly, one of the objects in the present invention is to provide a generic solution to the transmission and reception of data over a home network implemented upon an existing phone line system, in which a user does not have to identify any particular pair is of wires for data communication.

Other objects, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 1A:
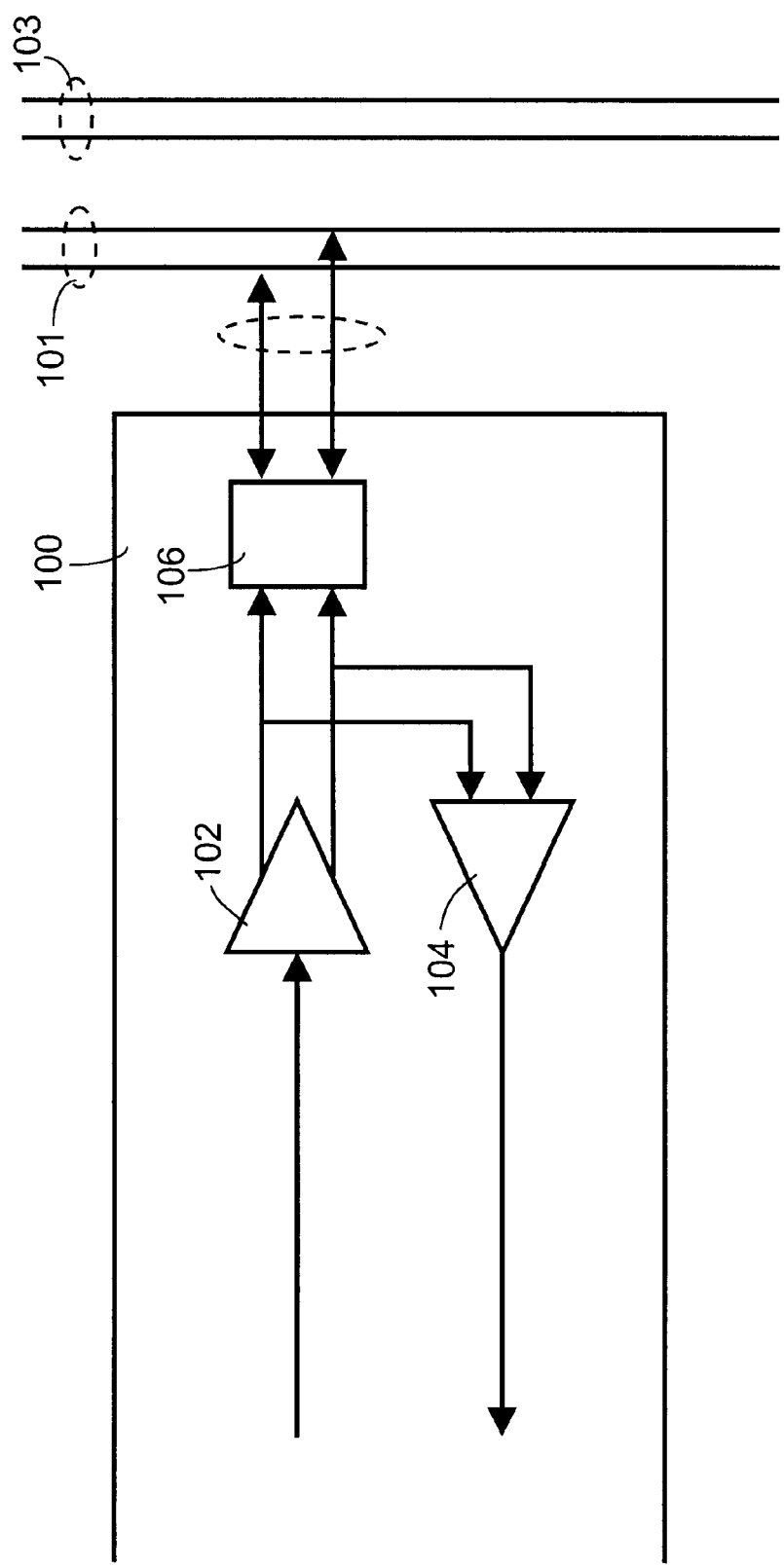
FIG. 1A one of the current implementations of a multiple access network over an existing wiring structure in a home.
Figure 1B:
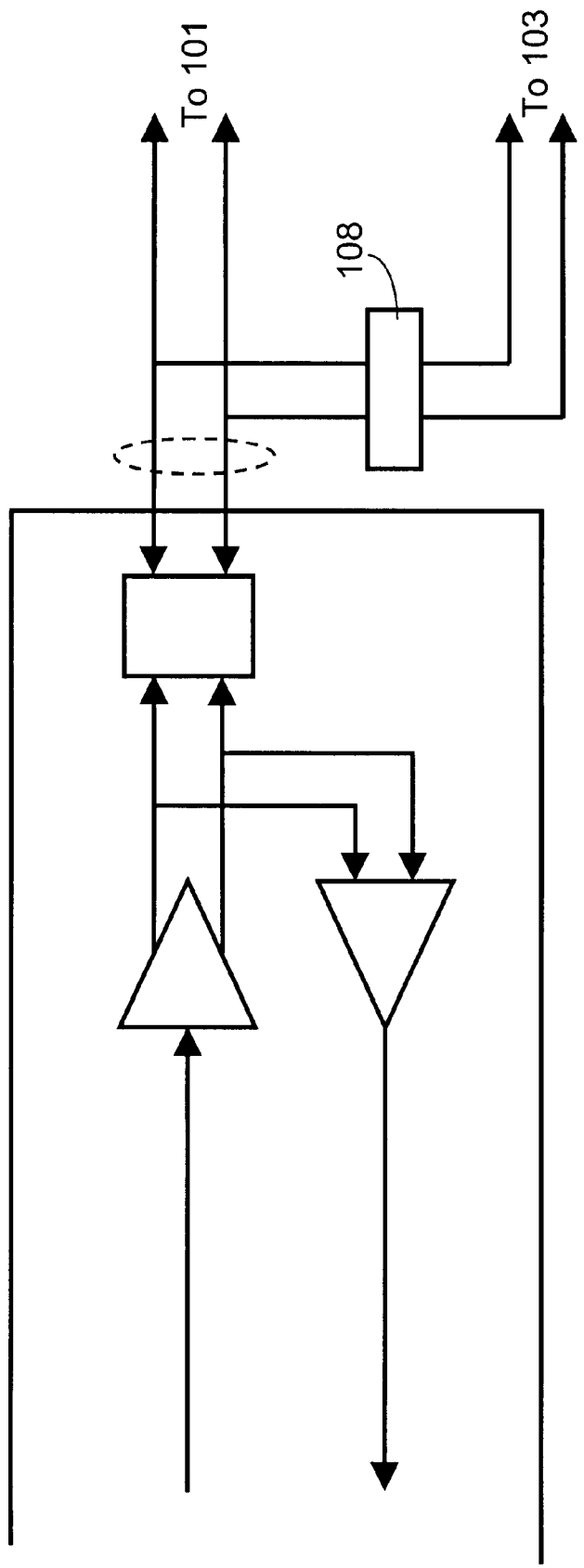
FIG. 1B demonstrates one of the methods to facilitate the use of a second pair of wires in the existing wiring structure in a home.
Figure 2:
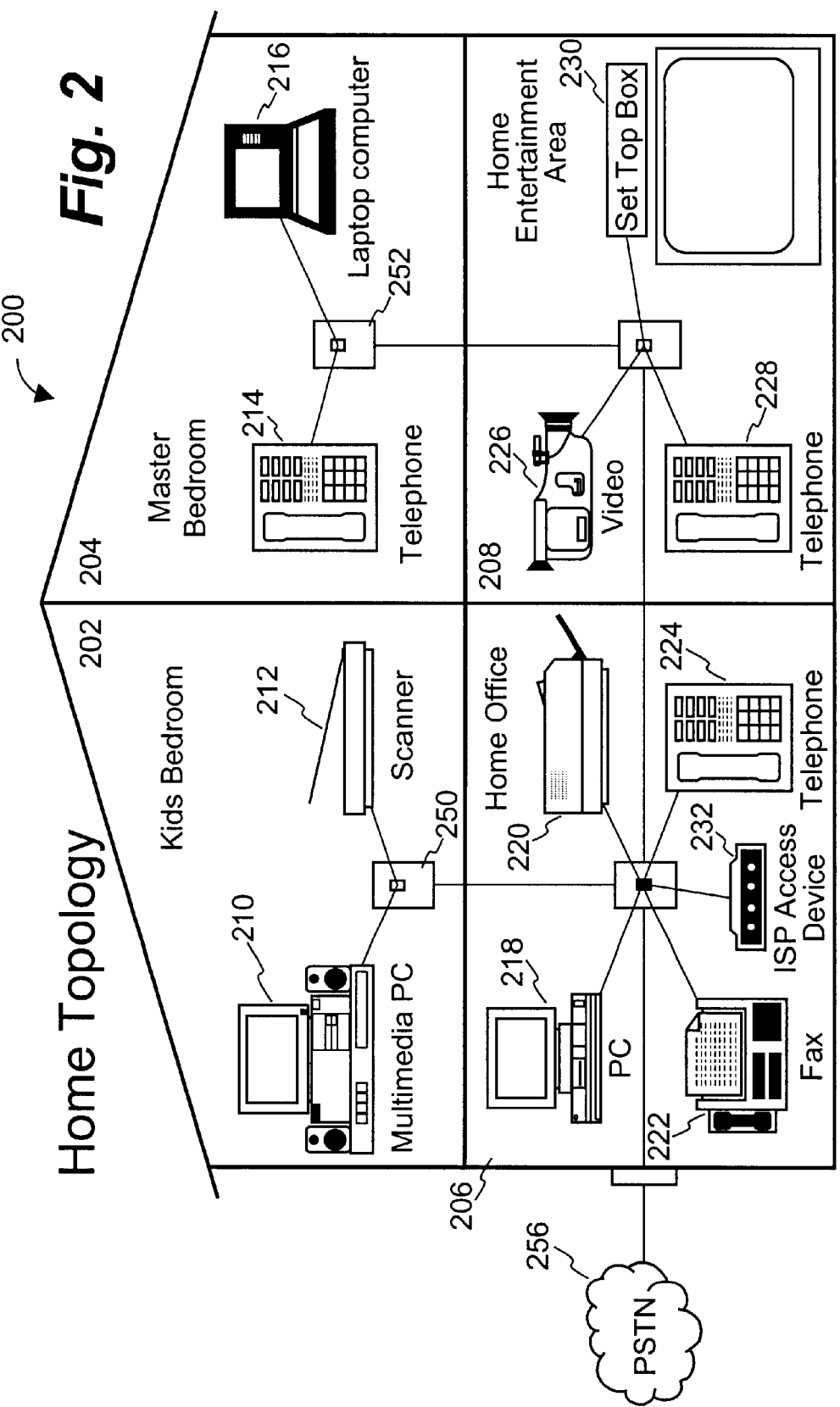
FIG. 2 shows a systemic diagram of a home network implemented over a phone line system in a home, in which the present invention may be practiced.

Referring now to the drawings, in which like numerals refer to like parts throughout the several views. FIG. 2 shows a home configuration in which the present invention may be practiced. As shown in the figure, there are four rooms 202, 204, 206 and 208 in the house 200, each having electronic devices that are coupled to a home data network. The home data network is implemented upon a phone line system in the house 200 and may be coupled to the Internet via an Internet service provider access device 232.

With reference to the figure, there is a multimedia personal computer 210 and a scanner 212 in the kids bedroom 202, a telephone 214 and laptop personal computer 216 in the master bedroom 204, a desktop personal computer 218, a printer 206, a telephone 224 and a fax machine 222 in the home office 206, and a video camera 226, a telephone 228 and a set top box 230 in the home entertainment area 208. To be more specific, telephones 214, 224 and 228 and fax machine 222 are generally coupled to the phone line system for phone services while other devices, referred to herein as computing devices, are coupled to the phone line system for home data networking. Each of the computing devices may share data produced in another device. For example, The scanner 212 in the kids room generates an image of a picture, the image can be transmitted to the personal computer 218 for further editing process and finally the edited image can be printed from the laser printer 220, all via the home data network.

Graphically, the home data network is overlapping the phone line system because it is implemented over the phone line system. Although all devices are connected to the same phone line system, only telephones 214, 224 and 228 and fax machine 222 communicate with the public switched telephone network (PSTN) 256. The rest of the devices communicate over the home data network may or may not communicate with PSTN 266 but communicate among themselves.

Figure 3:
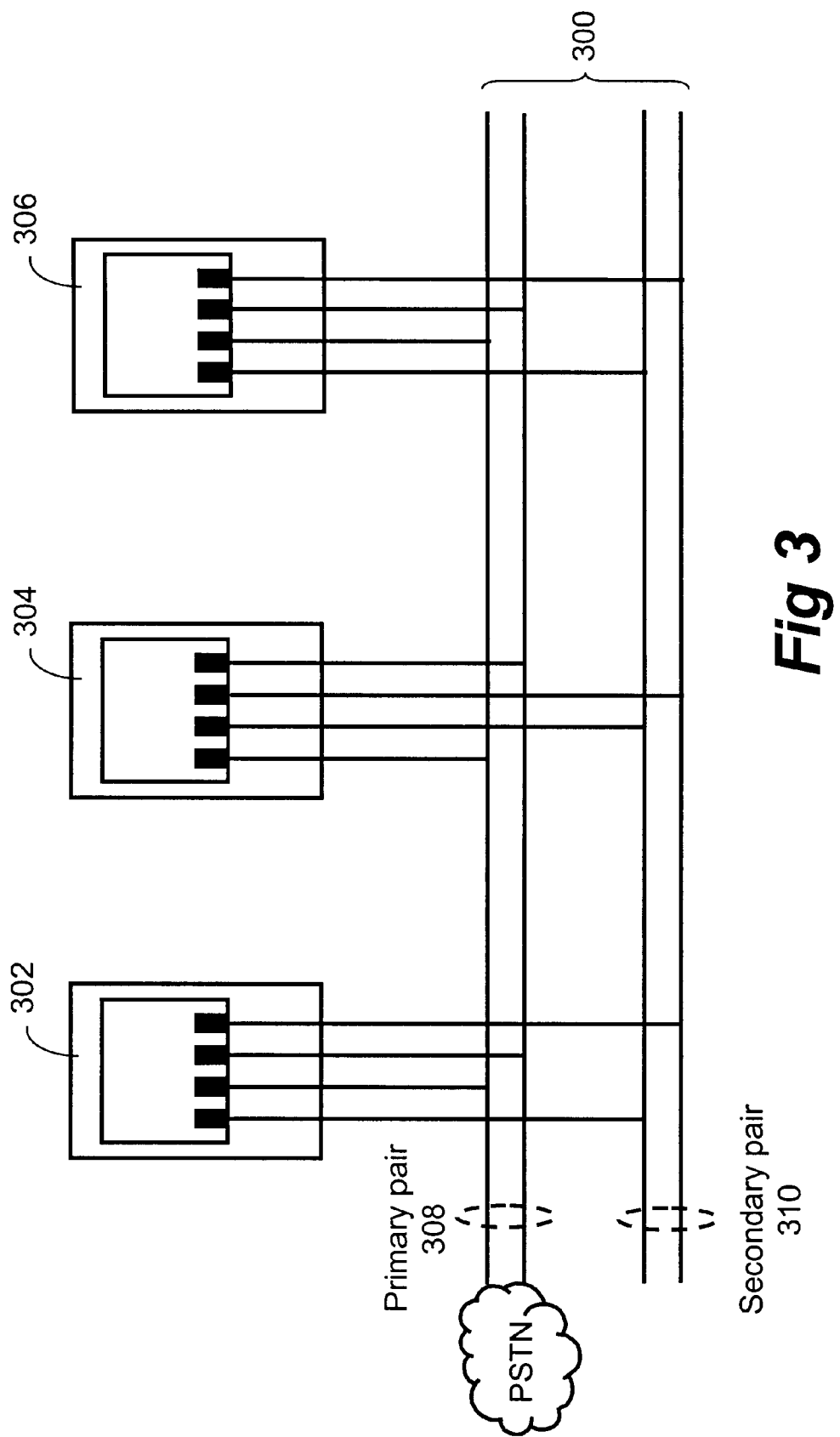
FIG. 3 demonstrates an example of how an existing 4-wire phone line system to which three wall outlets are interfaced.

FIG. 3 illustrates an example of how three wall outlets to (phone jacks) 302, 304 and 306 are coupled to an existing 4-wire phone line system 300. Each of the wall outlets 302, 304 and 306 has two pairs of connectors. It is assumed that the center two connectors form a first pair of connectors and the outer two connectors form a second pair of connectors. If a pair of wires 308 are coupled to the PSTN for the telephone service access and connected to the first pair of connectors of the wall outlets, the outlets 302 and 306 will be provided the access to the telephone service while the outlet 304 has no such access. To be specific, a telephone using the first pair of connectors can only be plugged into the outlets 302 or 306 (not the outlet 304) for the phone services.

When the wall outlets 302, 304 and 306 are used for the computing devices to communicate over the home network, it is desirable that the wall outlets 302, 304 and 306 will make no difference to a user. In other words, a device using the first pair 308 to access the home network can still be plugged into the outlet 304 for communication with devices coupled on the first pair 308.

Figure 4:
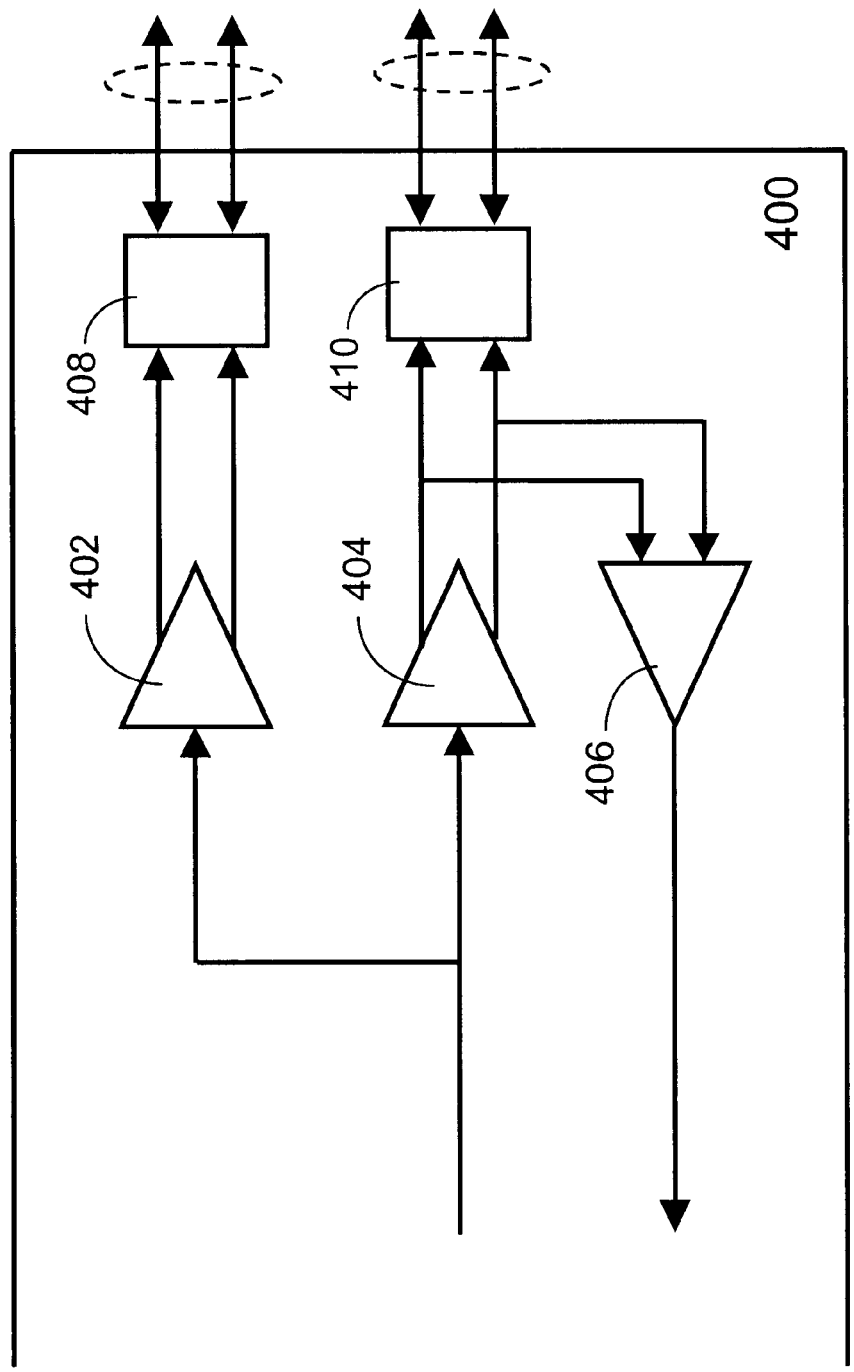
FIG. 4 shows a network card used in a computing device for home networking according to one embodiment of the present invention.

FIG. 4 shows a home network interface 400 used in a network card in a computing device for home networking according to one embodiment of the present invention and shall be understood in conjunction with FIG. 3. The interface 400 comprises two differential transmitters 402 and 404. To facilitate the description of the invention, differential transmitters 402 and 404 are respectively referred to as the primary and secondary differential transmitters, indicating that the primary differential transmitter is coupled to the primary pair of wires 308 and the secondary differential transmitter is coupled to the secondary pair of wires 310. Each of the differential transmitters 402 and 404 is coupled to the telephone line system via a respective line isolator 408 or 410. It is understood to those skilled in the art that the line isolator 408 or 410 used herein is to decouple the differential transmitter from the regular telephone service access. There are many available isolators such as capacitor isolator or transformer isolator that may be used.

As shown in the figure, a data stream to be communicated over the home network is fed to both differential transmitters 402 and 404 that further send the data stream simultaneously to both the primary and second pairs of wires in the phone line system, thereby all devices coupled to the phone line system, regardless which pair of wires being coupled onto, can receive the data stream.

It is understood that each of the computing devices is provided with a network card. Because the transmission from a computing device that transmits the data stream is coming from both pairs of the wires, namely either one of the pairs of wires in the phone line system, there is, therefore, needed only one differential receiver. Hence the interface 400 further comprises a differential receiver 406, coupled to one of the line isolators 408 or 410 to receive a data stream from the home network.

Figure 5:
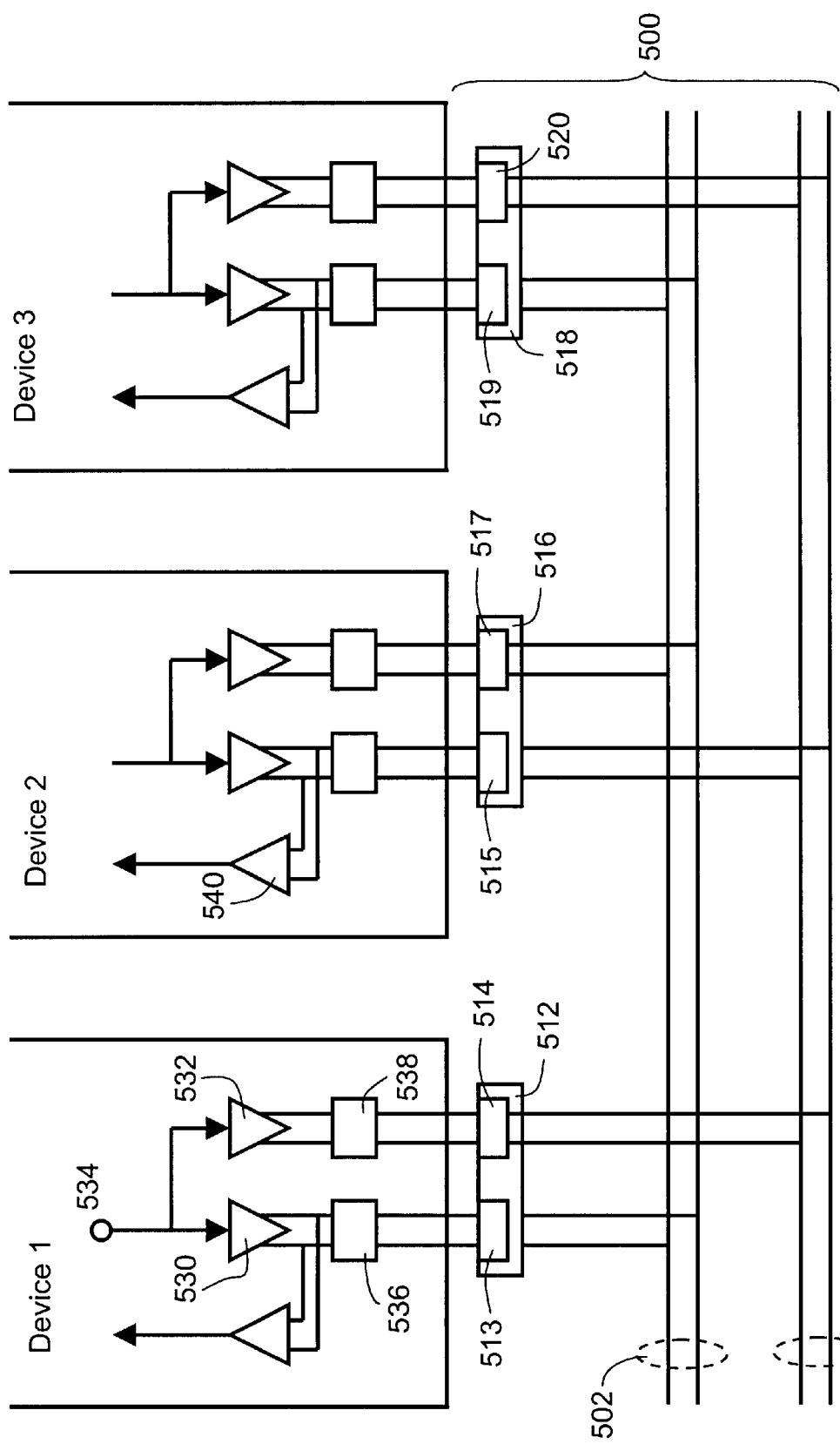
FIG. 5 shows a home network employing the present invention and implemented over a phone line system.

FIG. 5 shows a home network employing the present invention and implemented over a phone line system 500. There are two pairs of wires, one being the primary pair 502 and the other being the second pair 504, in the phone line system 500. Three computing devices (i.e. device 1, device 2 and device 3) are connected to the phone line system 500 via a respective phone outlet 512, 514 or 516. Each of the phone outlets 512, 516 and 518 has at least four wires to connectors, for example, in outlet 512, a first pair of connectors 513 is for connecting to the primary pair of wires 502 and a second pair of connectors 514 is for connecting to the secondary pair of wires as 504.

As shown in the figure, device 2 has the secondary pair of connectors 517 connected to the primary pair of wires 502 and the primary pair of connectors 515 connected to the secondary pair of wires 504. As described above, this often happens when a user of the device 508 has no knowledge of the phone line system 500 and can not identify which pair of wires is the primary pair of wires. It is understood practically that either one of the pairs 502 or 504 can be used to carry the phone services.

When device 1 sends transmit data over the phone line system 500, device 2 uses a network card employing the present invention can receive the transmit data, so does device 3. As described above, the network card in device 1 uses a pair of transmitter 530 and 502, both receiving the transmit data from a data source 534. Through a pair of line isolator 536 and 538, the transmit data is broadcast, through the outlet 512, onto both of the primary and the secondary of wires 502 and 504. In other words, both of the primary and the secondary of wires 502 and 504 now carry the transmit data and therefore both device 2 and device 3 may receive the transmit data.

To be specific, device 2 receives the transmit data from the secondary pair of wires 504 while device 3 receives the transmit data from the primary pair of wires 602. As shown in the figure, receiver 540 in the device 2 receives the transmit data from the secondary pair of wires 504 and receiver 542 in the device 3 receives the transmit data from the primary pair of wires 502.

Figure 6:
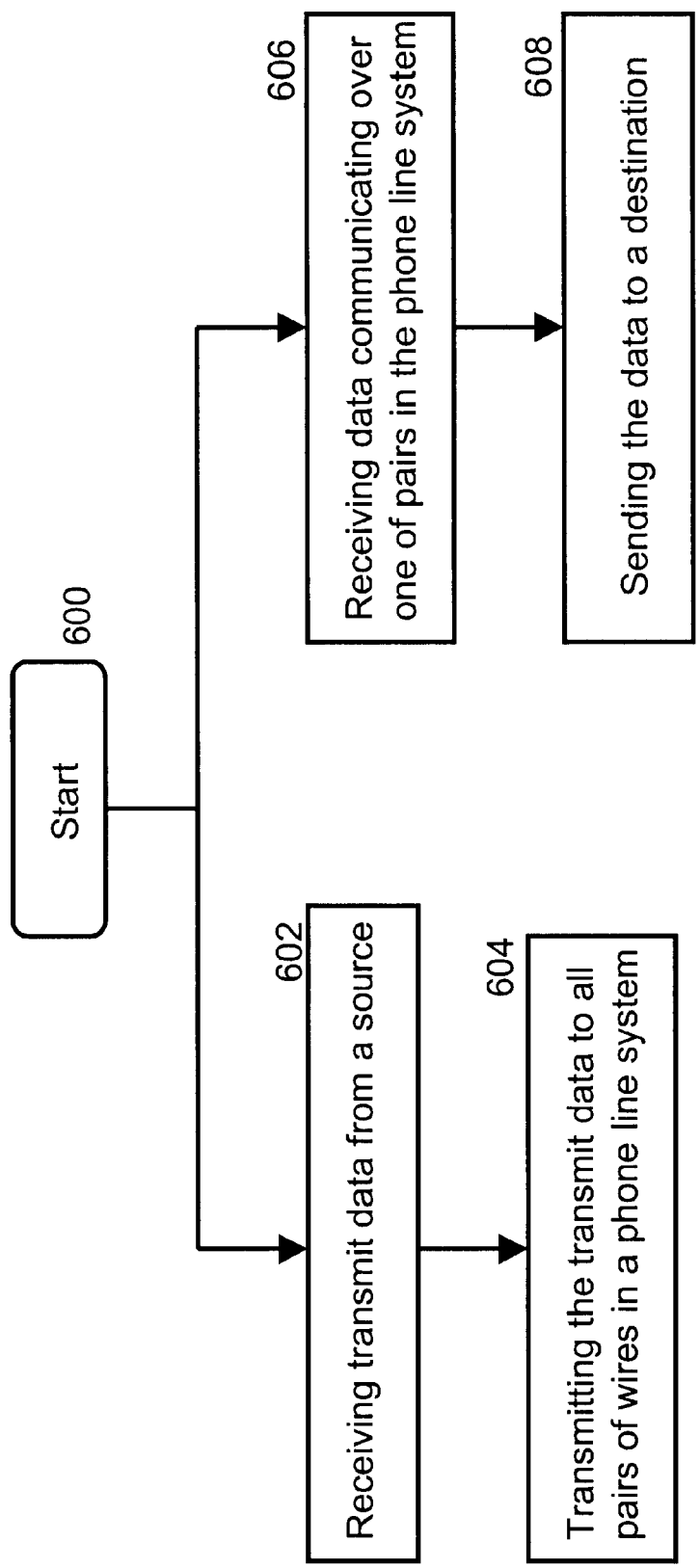
FIG. 6 illustrates a flowchart according to one embodiment of the present invention.

FIG. 6 shows a flowchart 600 according to one embodiment of the present invention. In the above description, it is assumed that the home phone system is a four-wire structure. Those skilled in the art that the description above is equally applied to a phone system comprising more than 2 pairs of wires. At 602, transmit data arrives for communication over a phone line system, there are a number of transmitters, each responsible for one pair of wires in the phone line system. At 604, the transmitters transmit the transmit data over all of the pairs of wires in the phone line system. As such, any computing devices, regardless which pair being connected thereto, can receive the transmit data.

From the receiving perspective, there is needed only one receiver because all of the pairs of wires carrying the transmit data. The transmit data, namely the incoming data to the receiver can be received from any one of the pairs at 606. Once receiving the transmit data, namely the incoming data to the receiver, at 608 the receiver sends the data to a destination that may be a memory in a device that includes the interface employing the receiver. It can be appreciated by now that one of the advantages and benefits of the present invention is to eliminate the request from the user who otherwise must know which pair of wires are carrying the transmit data.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. A method for data communication over a home network implemented on a phone line system including a primary pair of wires and a secondary pair of wires, the method comprising:

receiving transmit data from a data transmitting source; and transmitting, through a pair of transmitters, the transmit data to both the primary pair of wires and the secondary pair of wires in the phone line system, wherein both of the transmitters are respectively coupled to the primary pair and the secondary pair of wires via a first line and a second line isolator without a respective direct link in parallel so that a computing device coupled to the phone line system, regardless through the primary pair of wires or the secondary pair of wires, can receive the transmit data.

2. The method as recited in claim 1, wherein the phone line system carries phone services.

3. The method as recited in claim 2, wherein the line isolator isolates respectively the transmitters from the phone services.

4. The method as recited in claim 1, further comprising:

receiving, through a receiver, incoming data transmitting in the phone line system.

5. The method as recited in claim 4, wherein the incoming data is sent from the transmitters in the computing device coupled to the phone line system.

6. The method as recited in claim 5, wherein the incoming data is from the primary pair of wires.

7. The method as recited in claim 5, wherein the incoming data is from the secondary pair of wires.

* * * * *